(12) United States Patent
Miyano

(10) Patent No.: US 9,744,968 B2
(45) Date of Patent: Aug. 29, 2017

(54) IMAGE PROCESSING APPARATUS AND IMAGE PROCESSING METHOD

(71) Applicant: TOYOTA JIDOSHA KABUSHIKI KAISHA, Toyota-shi, Aichi-ken (JP)

(72) Inventor: Ruiko Miyano, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 3 days.

(21) Appl. No.: 15/062,677

(22) Filed: Mar. 7, 2016

(65) Prior Publication Data
US 2016/0272206 A1 Sep. 22, 2016

(30) Foreign Application Priority Data
Mar. 17, 2015 (JP) ................ 2015-053277

(51) Int. Cl.
*G01C 21/00* (2006.01)
*B60W 30/16* (2012.01)
(Continued)

(52) U.S. Cl.
CPC ............ *B60W 30/16* (2013.01); *B60R 1/00* (2013.01); *B60R 11/04* (2013.01); *B60W 10/18* (2013.01); *B60W 10/20* (2013.01); *G06K 9/00791* (2013.01); *G06K 9/00805* (2013.01); *G06K 9/4604* (2013.01); *G06K 9/4638* (2013.01); *G06K 9/6215* (2013.01); *B60R 2300/302* (2013.01); *B60R 2300/306* (2013.01);
(Continued)

(58) Field of Classification Search
CPC ...... B60W 30/16; B60W 10/20; B60W 10/18; B60W 2420/42; B60W 2550/30; B60R 1/00; B60R 11/04; B60R 2300/307; B60R 2300/302; B60R 2300/306; G06K 9/00805; G06K 9/4604; G06K 9/6125; G06K 9/00791; G06K 9/4638; G06T 2207/30261
See application file for complete search history.

(56) References Cited

U.S. PATENT DOCUMENTS

| 2009/0238458 A1* | 9/2009 | Golan | G06K 9/4604 382/173 |
| 2010/0322522 A1* | 12/2010 | Wang | G06K 9/6211 382/218 |

(Continued)

FOREIGN PATENT DOCUMENTS

JP 2014102805 A 6/2014

*Primary Examiner* — Mary Cheung
(74) *Attorney, Agent, or Firm* — Sughrue Mion, PLLC

(57) ABSTRACT

An object recognizer of an image processing apparatus separately extracts a first feature point and a second feature point of a first line segment and a second line segment of which a variation is equal to or greater than a variation threshold value and the first feature point and the second feature point of the first line segment and the second line segment of which the variation is smaller than the variation threshold value, and determines a corresponding point in a second captured image corresponding to the first feature point of the first line segment of which the variation is equal to or greater than the variation threshold value as the second feature point of the second line segment corresponding to the first line segment of which the variation is equal to or greater than the variation threshold value to recognize an object.

20 Claims, 9 Drawing Sheets

(51) Int. Cl.
  *G06K 9/00* (2006.01)
  *G06K 9/46* (2006.01)
  *B60R 11/04* (2006.01)
  *B60W 10/18* (2012.01)
  *B60W 10/20* (2006.01)
  *G06K 9/62* (2006.01)
  *B60R 1/00* (2006.01)

(52) U.S. Cl.
  CPC .... *B60R 2300/307* (2013.01); *B60W 2420/42* (2013.01); *B60W 2550/30* (2013.01); *G06T 2207/30261* (2013.01)

(56) References Cited

U.S. PATENT DOCUMENTS

| | | | | |
|---|---|---|---|---|
| 2011/0150279 | A1* | 6/2011 | Kotake | G06T 7/55 382/103 |
| 2012/0314935 | A1* | 12/2012 | Cheng | G06K 9/00671 382/154 |
| 2014/0029852 | A1* | 1/2014 | Pisipati | G06T 7/0042 382/182 |
| 2014/0063252 | A1* | 3/2014 | Zhao | G06T 7/80 348/148 |

* cited by examiner

IMAGE PROCESSING APPARATUS AND IMAGE PROCESSING METHOD

CROSS-REFERENCE TO RELATED APPLICATIONS

The disclosure of Japanese Patent Application No. JP2015-053277 filed on Mar. 17, 2015 is incorporated herein by reference in its entirety.

TECHNICAL FIELD

Aspects of the present disclosure relate to an image processing apparatus and an image processing method.

BACKGROUND

A technique for recognizing an object based on a captured image obtained using a camera has been proposed. For example, Japanese Unexamined Patent Application Publication No. 2014-102805 discloses an apparatus that extracts a straight line such as an outline of an object from each of two captured images obtained by imaging the object from different viewpoints, respectively.

The apparatus disclosed in Japanese Unexamined Patent Application Publication No. 2014-102805 extracts a feature point such as an intersection point (corner point) of straight lines extracted from each of two captured images. The apparatus disclosed in Japanese Unexamined Patent Application Publication No. 2014-102805 recognizes the object by associating the feature points extracted from each of the two captured images with each other.

However, in the apparatus disclosed in Japanese Unexamined Patent Application Publication No. 2014-102805, a feature point based on the outline of the object which is a recognition target and a feature point based on the outline of a distant scene which is not the recognition target are extracted in a batch. When the object relatively moves with respect to a camera, while the outline of the object moves in a captured image, the outline of the distant scene does not move in the captured image. In this case, for example, if an intersection point between the outline of the object and the outline of the distant scene is used as a feature point based on the outline of the object, the feature point moves on the outline of the object, and thus, a position which is not the same position on the object in reality may be erroneously recognized as the same position, or the position or a movement amount of the object may not be accurately recognized. Accordingly, recognition accuracy of the object may deteriorate, and thus, improvement is desirable.

SUMMARY

Accordingly, an object of the present disclosure is to provide an image processing apparatus and an image processing method capable of enhancing, in recognition of an object based on a captured image obtained using a camera, recognition accuracy of the object.

According to an aspect of the present disclosure, there is provided an image processing apparatus that recognizes an object based on a captured image obtained by a camera, including: a line segment extractor configured to extract a plurality of first line segments with respect to a first captured image at a first time point and to extract a plurality of second line segments with respect to a second captured image at a second time point after the first time point; a feature point extractor configured to extract a first feature point of each of the first line segments and to extract a second feature point of each of the second line segments; a variation calculator configured to calculate a variation of a position of each of the second line segments corresponding to each of the first line segments in the second captured image with respect to a position of each of the first line segments in the first captured image; and an object recognizer configured to separately extract the first feature point and the second feature point of the first line segment and the second line segment of which the variation is equal to or greater than a variation threshold value and the first feature point and the second feature point of the first line segment and the second line segment of which the variation is smaller than the variation threshold value, and to determine a corresponding point in the second captured image corresponding to the first feature point of the first line segment of which the variation is equal to or greater than the variation threshold value as the second feature point of the second line segment corresponding to the first line segment of which the variation is equal to or greater than the variation threshold value to recognize the object.

According to this configuration, the object recognizer dividedly extracts the first feature point and the second feature point of the first line segment and the second line segment of which the variation is equal to or greater than the variation threshold value and the first feature point and the second feature point of the first line segment and the second line segment of which the variation is smaller than the variation threshold value, and determines the corresponding point in the second captured image corresponding to the first feature point of the first line segment of which the variation is equal to or greater than the variation threshold value as the second feature point of the second line segment corresponding to the first line segment of which the variation is equal to or greater than the variation threshold value to recognize the object. Thus, the first feature point and the second feature point based on only an object which is a recognition target, and the first feature point and the second feature point based on a distant scene which is not a recognition target are distinguished from each other, and the first feature point and the second feature point based on only the object which is the recognition target are associated with each other. Thus, it is possible to enhance recognition accuracy of the object.

Further, in this case, the object recognizer may extract the first feature point which is an intersection point between an end point of the first line segment of which the variation is smaller than the variation threshold value and the first line segment of which the variation is equal to or greater than the variation threshold value, as the first feature point of the first line segment of which the variation is smaller than the variation threshold value, to recognize the object.

According to this configuration, the object recognizer extracts the first feature point which is the intersection point between the end point of the first line segment of which the variation is smaller than the variation threshold value and the first line segment of which the variation is equal to or greater than the variation threshold value, as the first feature point of the first line segment of which the variation is smaller than the variation threshold value, to recognize the object. Thus, the first feature point based on only an object which is a recognition target, and an intersection point between an outline of the object which is the recognition target and an outline of an object which is not a recognition target are distinguished from each other. Thus, it is possible to reduce erroneous recognition.

Further, in this case, the object recognizer may determine the corresponding point in the second captured image corresponding to the first feature point which is the intersection point between the end point of the first line segment of which the variation is smaller than the variation threshold value and the first line segment of which the variation is equal to or greater than the variation threshold value based on a positional relationship in the first captured image between the first feature point which is the intersection point between the end point of the first line segment of which the variation is smaller than the variation threshold value and the first line segment of which the variation is equal to or greater than the variation threshold value, and the first feature point of the first line segment of which the variation is equal to or greater than the variation threshold value.

According to this configuration, the object recognizer determines the corresponding point in the second captured image corresponding to the first feature point which is the intersection point between the end point of the first line segment of which the variation is smaller than the variation threshold value and the first line segment of which the variation is equal to or greater than the variation threshold value based on the positional relationship in the first captured image between the first feature point which is the intersection point between the end point of the first line segment of which the variation is smaller than the variation threshold value and the first line segment of which the variation is equal to or greater than the variation threshold value, and the first feature point of the first line segment of which the variation is equal to or greater than the variation threshold value. Thus, the corresponding point in the second captured image corresponding to an intersection point between an outline of an object which is a recognition target and an outline of a distant scene which is not a recognition target in the first captured image is determined based on the first feature point and the second feature point based on only the object which is the recognition target. Thus, it is possible to enhance recognition accuracy of the object.

According to another aspect of the present disclosure, there is provided an image processing method using an image processing apparatus that recognizes an object based on a captured image obtained by a camera, the method including: a line segment extraction process of extracting a plurality of first line segments with respect to a first captured image at a first time point and extracting a plurality of second line segments with respect to a second captured image at a second time point after the first time point, by a line segment extractor of the image processing apparatus; a feature point extraction process of extracting a first feature point of each of the first line segments and extracting a second feature point of each of the second line segments, by a feature point extractor of the image processing apparatus; a variation calculation process of calculating a variation of a position of each of the second line segments corresponding to each of the first line segments in the second captured image with respect to a position of each of the first line segments in the first captured image, by a variation calculator of the image processing apparatus; and an object recognition process of separately extracting the first feature point and the second feature point of the first line segment and the second line segment of which the variation is equal to or greater than a variation threshold value and the first feature point and the second feature point of the first line segment and the second line segment of which the variation is smaller than the variation threshold value, and determining a corresponding point in the second captured image corresponding to the first feature point of the first line segment of which the variation is equal to or greater than the variation threshold value as the second feature point of the second line segment corresponding to the first line segment of which the variation is equal to or greater than the variation threshold value to recognize the object, by an object recognizer of the image processing apparatus.

In this case, in the object recognition process, the first feature point which is an intersection point between an end point of the first line segment of which the variation is smaller than the variation threshold value and the first line segment of which the variation is equal to or greater than the variation threshold value may be extracted as the first feature point of the first line segment of which the variation is smaller than the variation threshold value to recognize the object.

Further, in this case, in the object recognition process, the corresponding point in the second captured image corresponding to the first feature point which is the intersection point between the end point of the first line segment of which the variation is smaller than the variation threshold value and the first line segment of which the variation is equal to or greater than the variation threshold value may be determined based on a positional relationship in the first captured image between the first feature point which is the intersection point between the end point of the first line segment of which the variation is smaller than the variation threshold value and the first line segment of which the variation is equal to or greater than the variation threshold value, and the first feature point of the first line segment of which the variation is equal to or greater than the variation threshold value.

According to the aspects of the present disclosure, when recognizing an object based on a captured image obtained using a camera, it is possible to enhance recognition accuracy of the object.

DETAILED DESCRIPTION

Hereinafter, an image processing apparatus and an image processing method according to exemplary embodiments of the present disclosure will be described with reference to the accompanying drawings.

Figure 1:
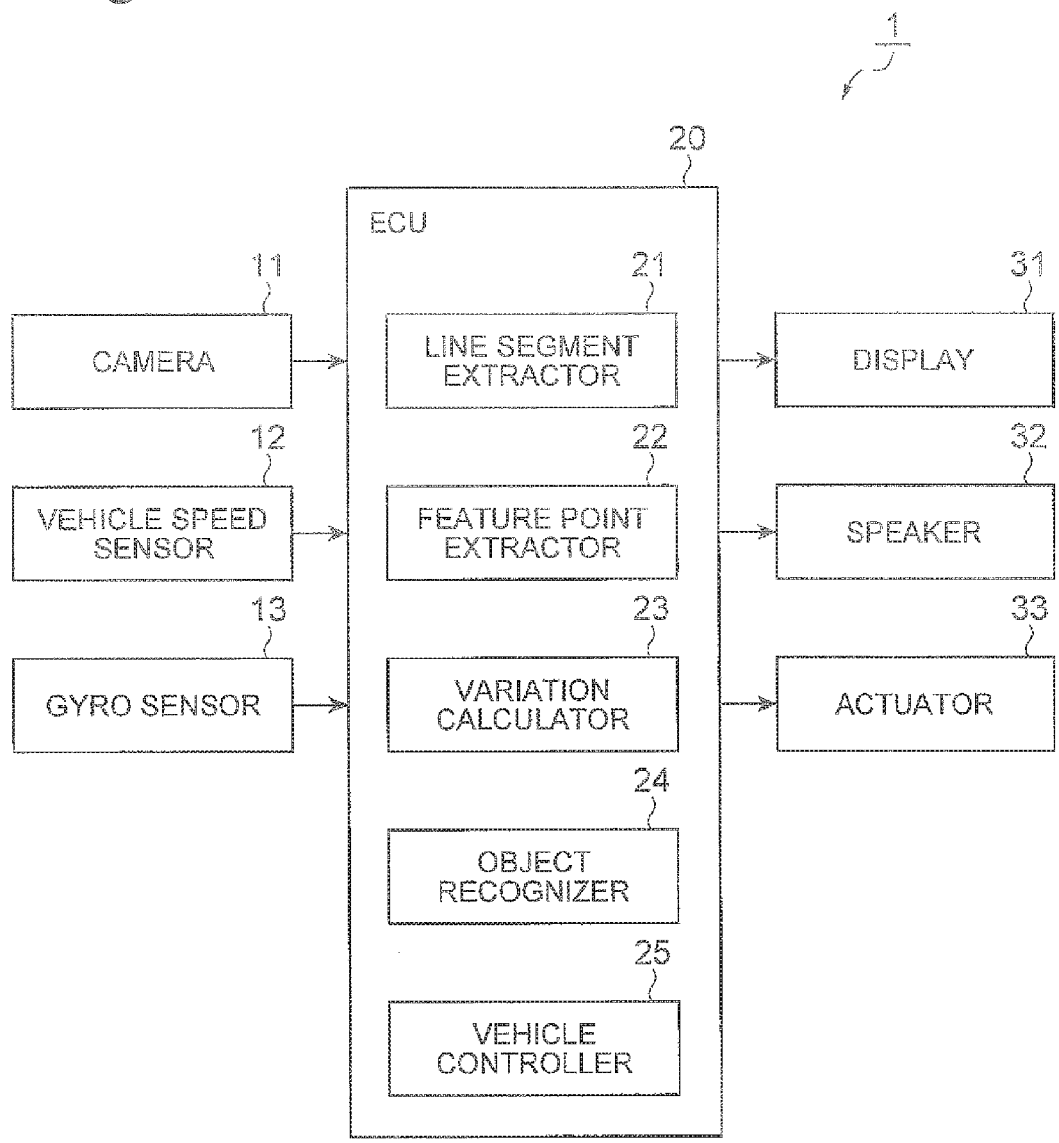
FIG. 1 is a block diagram illustrating an image processing apparatus according to an embodiment.

As shown in FIG. 1, an image processing apparatus 1 according to a first embodiment includes a camera 11, a vehicle speed sensor 12, a gyro sensor 13, an ECU 20, a display 31, a speaker 32, and an actuator 33. The image processing apparatus 1 is mounted on a vehicle such as an automobile, and recognizes an object based on a captured image obtained using the camera 11 during traveling of the vehicle.

The camera 11 is a monocular camera having one image-capturing unit provided on a rear surface of a front windshield of the vehicle. The camera 11 transmits information relating to a captured image of a front scene of the vehicle to the ECU 20. The camera 11 may be any one of a monochrome camera and a color camera. Further, the camera 11 may be a stereo camera.

The vehicle speed sensor 12 is a sensor for detecting the speed of the vehicle. As the vehicle speed sensor 12, for example, a wheel speed sensor that is provided in a vehicle wheel of the vehicle, an axle that integrally rotates with the vehicle wheel, or the like, and detects a rotational speed of the vehicle wheel as a signal may be used. The vehicle speed sensor 12 transmits a signal depending on the rotational speed of the vehicle wheel to the ECU 20.

The gyro sensor 13 includes an azimuth angle sensor or a yaw rate sensor. The azimuth angle sensor is a sensor for detecting a traveling direction of the vehicle. The azimuth angle sensor transmits a signal depending on the traveling direction of the vehicle to the ECU 20. The yaw rate sensor is a sensor for detecting a yaw rate (rotational angle speed) around a vertical axis of the center of gravity of the vehicle to detect a direction of the vehicle. The yaw rate sensor outputs a signal depending on the detected yaw rate of the vehicle to the ECU 20.

The ECU 20 is an electronic control unit having a central processing unit (CPU), a read only memory (ROM), a random access memory (RAM), and the like. The ECU 20 loads a program stored in the ROM to the RAM to be executed by the CPU, so that hardware of the ECU 20 functions as a line segment extractor 21, a feature point extractor 22, a variation calculator 23, an object recognizer 24, and a vehicle controller 25. The ECU 20 may be configured by plural ECUs, or may be a single ECU.

The line segment extractor 21 extracts plural first line segments with respect to a first captured image at a first time point, and extracts plural second line segments with respect to a second captured image at a second time point after the first time point. An interval between the first time point and the second time point may be set as 50 msec to 100 msec, for example. The line segment extractor 21 extracts the first line segments with respect to the first captured image and extracts the second line segments with respect to the second captured image by Hough transform, for example. Further, the line segment extractor 21 may extract the first line segments and the second line segments by other methods.

The feature point extractor 22 extracts a first feature point of each of the first line segments and registers the first feature points in association with each of the first line segments, and extracts a second feature point of each of the second line segments and registers the second feature points in association with each of the second line segments. The first feature point of the first line segment includes a point having a predetermined luminance or higher, which is present at a position within a predetermined distance from the first feature point. Further, the first feature point of the first line segment includes an end point of the first line segment, for example. The end point of the first line segment includes an end point which is an end point of one first line segment and is an intersection point (corner point) with another first line segment. The end point of the first line segment includes an end point which is an intersection point with an outer periphery of the first captured image. The feature point extractor 22 extracts the first feature point of each of the first line segments by a technique such as Harris corner detection, features from accelerated line segment test (FAST), speeded up robust features (SURF) or scale-invariant feature transform (SIFT), for example. One first feature point is extracted with respect to the respective plural first line segments in a duplicated manner, and one first feature point may be registered in association with each of the plural first line segments in a duplicated manner. The second feature point of the second line segment is also extracted in a similar way to the first feature point of the first line segment. Further, the feature point extractor 22 may extract the first feature point and the second feature point by other methods.

The variation calculator 23 calculates a variation of the position of each of the second line segments corresponding to each of the first line segments in the second captured image, with respect to the position of each of the first line segments in the first captured image. Whether or not the first line segment corresponds to the second line segment may be determined by comparing a pixel of the first feature point included in the first line segment with a pixel of the second feature point included in the second line segment. The variation calculator 23 calculates a variation from a difference between coordinates of an end point of each of the first line segments in the first captured image and coordinates of an end point of each of the second line segments in the second captured image, for example. The variation calculator 23 may calculate a variation from a difference between a slope of each of the first line segments in the first captured image and a slope of each of the second line segments in the second captured image, for example. Further, the variation calculator 23 may calculate a variation from a difference between coordinates of a middle point of each of the first line segments in the first captured image and coordinates of a middle point of each of the second line segments in the second captured image, for example.

As described later, the object recognizer 24 separately extracts a first feature point and a second feature point of a first line segment and a second line segment of which a variation is equal to or greater than a variation threshold value and a first feature point and a second feature point of a first line segment and a second line segment of which the variation is smaller than the variation threshold value, and determines a corresponding point in the second captured image corresponding to the first feature point of the first line segment of which the variation is equal to or greater than the variation threshold value as the second feature point of the second line segment corresponding to the first line segment of which the variation is equal to or greater than the variation threshold value to recognize an object. The variation threshold value refers to a threshold value of a variation for determining whether the first line segment and the second line segment are based on an outline or the like of an object which is a recognition target. The variation threshold value may be set as a large value when a vehicle speed detected by the vehicle speed sensor 12 or a yaw rate detected by the gyro sensor 13 is large, for example.

The vehicle controller 25 performs control for displaying an object recognized by the object recognizer 24 on the display 31. Further, the vehicle controller 25 performs control for notifying a driver through the display 31 or the speaker 32 of a necessary warning, when a distance from the recognized object is smaller than a predetermined threshold value. In addition, the vehicle controller 25 performs control for controlling any one operation among acceleration, braking and steering of the vehicle by the actuator 33 when the distance from the recognized object is smaller than the predetermined threshold value.

The display 31 includes at least one of a multi information display (MID) of a combination meter, a center display of an instrument panel, a head-up display (HUD), and the like. The display 31 may be configured by plural types of displays. The display 31 performs display according to a control signal from the vehicle controller 25 in the ECU 20.

The speaker 32 includes at least one of a speaker provided in the back of the instrument panel of the vehicle, a speaker provided inside a door of a driving seat of the vehicle, a built-in speaker of the ECU 20, and the like. The speaker 32 performs output of sound and notification of a warning according to a control signal from the vehicle controller 25 of the ECU 20

The actuator 33 is a device that controls any one operation among acceleration, braking and steering of the vehicle. The actuator 33 includes at least any one of a throttle actuator, a brake actuator, and a steering actuator. The throttle actuator controls an amount of air supplied (opening degree of a throttle) with respect to an engine according to a control signal from the ECU 20 to control a driving force of the vehicle. When the vehicle is a hybrid car or an electrically-powered car, the throttle actuator is not provided, and a control signal from the ECU 20 is input to a motor which is a power source, to thereby control the driving force.

The brake actuator controls a brake system according to a control signal from the ECU 20 to control a braking force to be given to the vehicle wheels of the vehicle. The brake system may employ a hydraulic brake system, for example. The steering actuator controls driving of an assist motor that controls a steering torque in an electric power steering system according to a control signal from the ECU 20. Thus, the steering actuator controls the steering torque of the vehicle.

Figure 2:
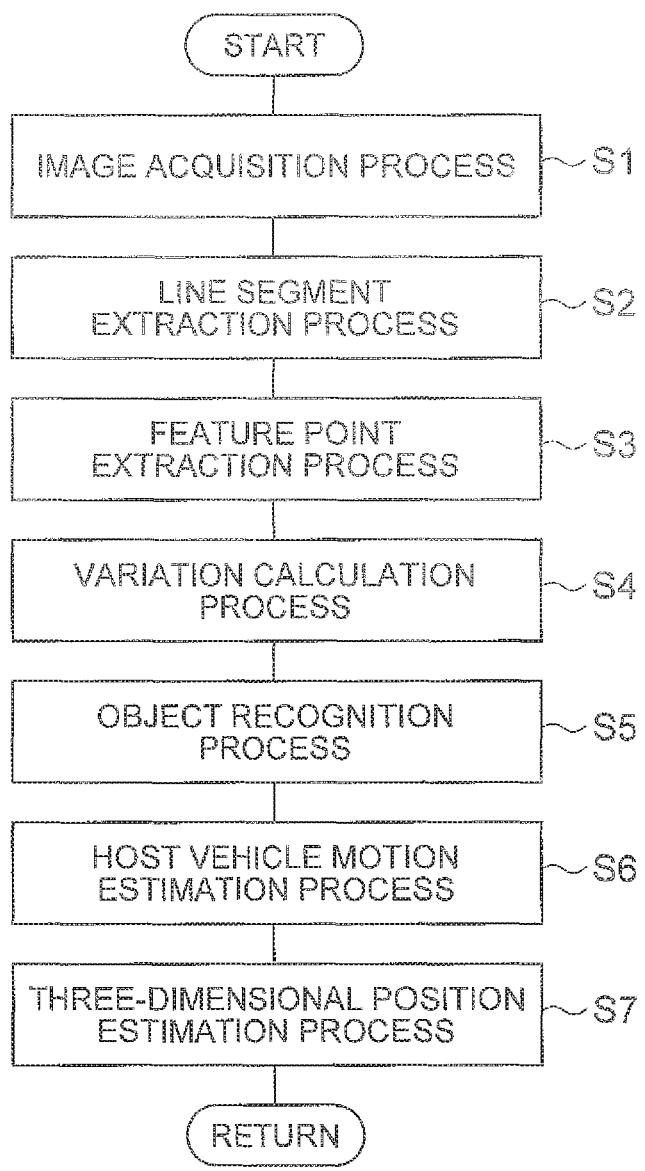
FIG. 2 is a flowchart illustrating an operation of the image processing apparatus shown in FIG. 1.
Figure 3A:
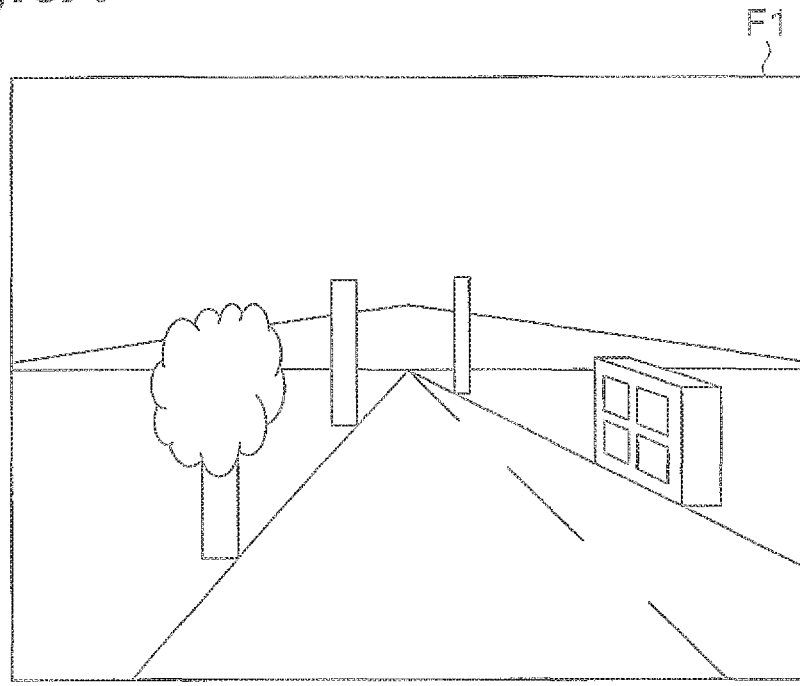
FIG. 3A is a diagram illustrating a first captured image at a first time point.
Figure 3B:
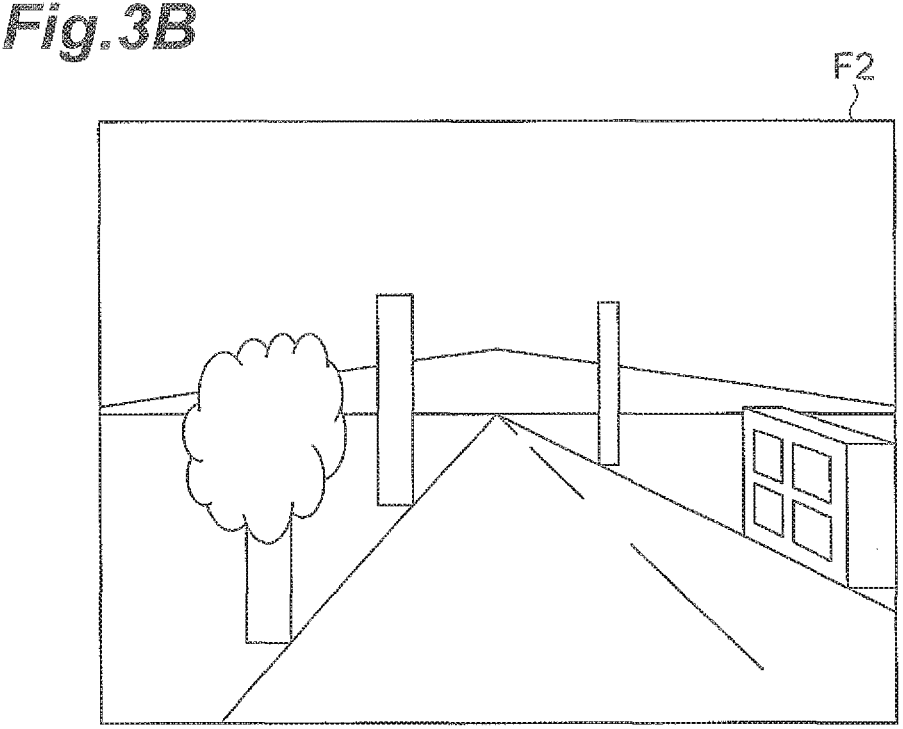
FIG. 3B is a diagram illustrating a second captured image at a second time point after the first time point.

Hereinafter, an operation of the image processing apparatus 1 of an embodiment will be described. As shown in FIG. 2, as an image acquisition process, the line segment extractor 21 of the ECU 20 acquires a captured image of a front scene of the vehicle using the camera 11 during traveling of the vehicle (S1). The line segment extractor 21 acquires a first captured image F1 at a first time point as shown in FIG. 3A, and acquires a second captured image F2 at a second time point as shown in FIG. 3B, for example. A building, a tree, a white line on a road surface, and the like included in the first captured image F1 at the first time point are disposed on a nearer side of the vehicle in the second captured image F2 at the second time point which is later than the first time point. On the other hand, the position of a mountain or the like in a distant view included in the first captured image F1 is not also changed in the second captured image F2.

Figure 4A:
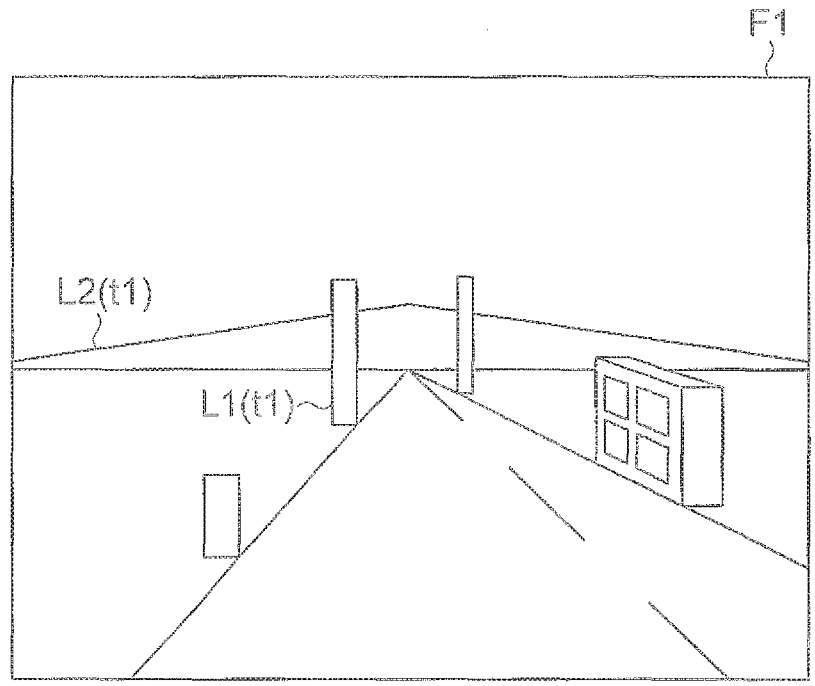
FIG. 4A is a diagram illustrating a state where plural first line segments are extracted with respect to the first captured image.
Figure 4B:
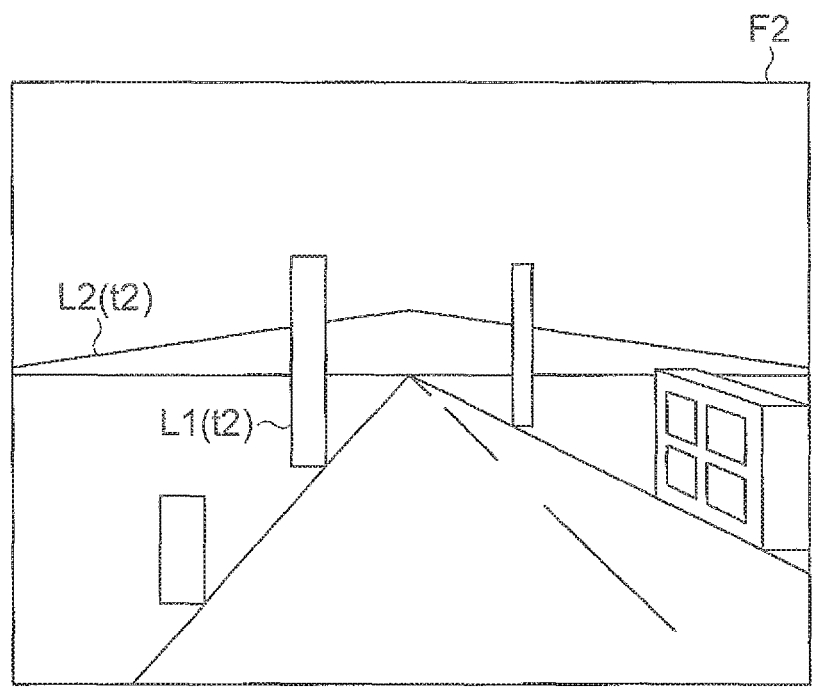
FIG. 4B is a diagram illustrating a state where plural second line segments corresponding to the first line segments are extracted with respect to the second captured image.

As shown in FIG. 2, as a line segment extraction process, the line segment extractor 21 extracts plural first line segments with respect to the first captured image F1 at the first time point, and extracts plural second line segments with respect to the second captured image F2 at the second time point (S2). As shown in FIG. 4A, a first line segment L1($t1$) which forms an outline of a tree is extracted with respect to the first captured image F1 at a first time point t1. Further, a first line segment L2($t1$) which forms an outline of a mountain in a distant view is extracted. Similarly, as shown in FIG. 4B, a second line segment L1($t2$) which forms an outline of a tree is extracted with respect to the second captured image F2 at a second time point t2. Further, a second line segment L2($t2$) which forms an outline of a mountain in a distant view is extracted.

Figure 5A:
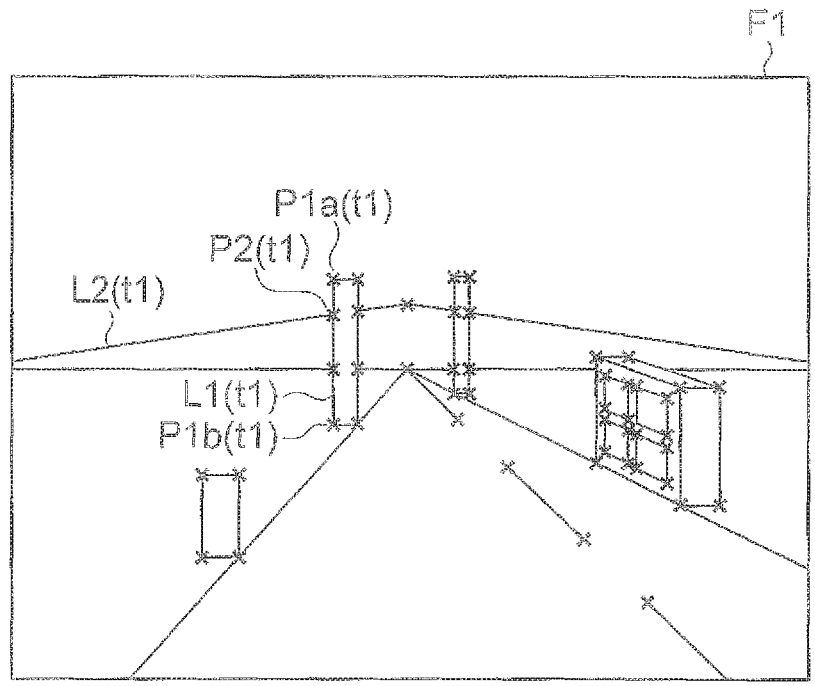
FIG. 5A is a diagram illustrating a state where a first feature point of each of the first line segments is extracted.
Figure 5B:
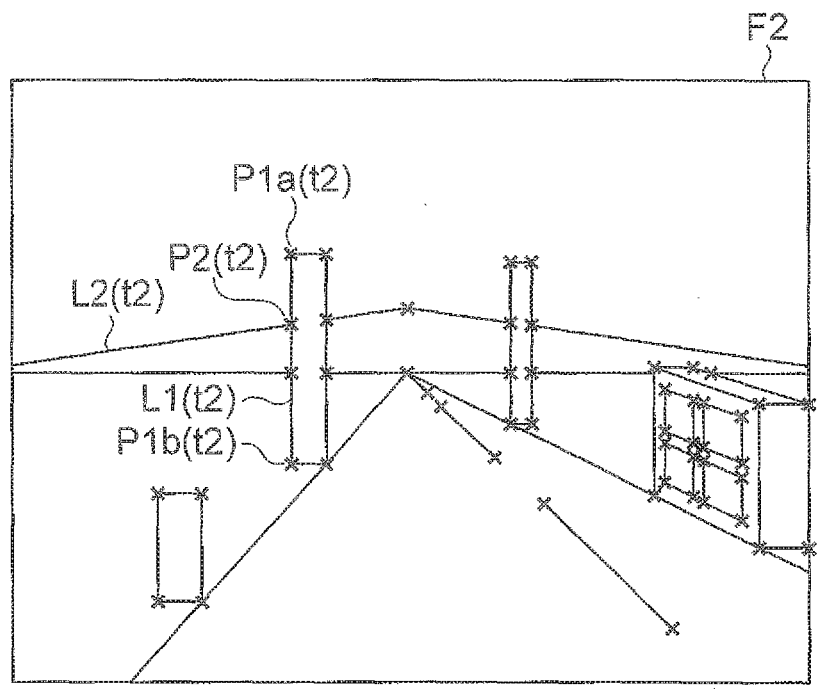
FIG. 5B is a diagram illustrating a state where a second feature point of each of the second line segments is extracted.

As shown in FIG. 2, as a feature point extraction process, the feature point extractor 22 of the ECU 20 extracts a first feature point of each of the first line segments L1($t1$), L2($t1$), and the like and registers the extracted first feature point in association with each of the first line segments L1($t1$), L2($t1$), and the like, and extracts a second feature point of each of the second line segments L1($t2$), L2($t2$), and the like and registers the extracted second feature point in association with each of the second line segments L1($t2$), L2($t2$), and the like (S3). As shown in FIG. 5A, first feature points P1$a$($t1$) and P1$b$($t1$) which are end points of the first line segment L1($t1$) are extracted. Further, a first feature point P2($t1$) which is an intersection point between an end point of the first line segment L2($t1$) and the first line segment L1($t1$) is extracted. Similarly, as shown in FIG. 5B, second feature points P1$a$($t2$) and P1$b$($t2$) which are end points of the second line segment L1($t2$) are extracted. Further, a second feature point P2($t2$) which is an intersection point between an end point of the second line segment L2($t2$) and the second line segment L1($t2$) is extracted. As described above, one first feature point P2($t1$) may be extracted with respect to the respective plural first line segments L1($t1$) and L2($t1$) in a duplicated manner, and may be registered in association with each of the plural first line segments L1($t1$) and L2($t1$) in a duplicated manner. Further, one second feature point P2($t2$) may be extracted with respect to the respective plural second line segments L1($t2$) and L2($t2$) in a duplicated manner, and may be registered in association with each of the plural second line segments L1($t2$) and L2($t2$) in a duplicated manner.

As shown in FIG. 2, as a variation calculation process, by the variation calculator 23 of the ECU 20 calculates a variation of a position of each of the second line segments L1($t2$), L2($t2$), and the like in the second captured image F2 corresponding to each of the first line segments L1($t1$), L2($t1$), and the like, with respect to a position of each of the first line segments L1($t1$), L2($t1$), and the like in the first captured image F1(S4). As shown in FIGS. 5A and 5B, a variation of the second line segment L1($t2$) with respect to the first line segment L1($t1$) which forms the outline of the tree is large. On the other hand, a variation of the second line segment L2($t2$) with respect to the first line segment L2($t1$)

which forms the outline of the mountain in a distant view is small, for example, approximately 0. When the variation of a line segment forming the outline of an object is small, the object may be considered a distant scene. Conversely, when the variation of a line segment forming the outline of an object is large, the object may be considered a close object, or a target object which may be recognized by an object recognition process.

As shown in FIG. 2, as an object recognition process by the object recognizer 24 of the ECU 20, the object recognizer extracts the first feature points P1$a$($t$1) and P1$b$($t$1) and the second feature points P1$a$($t$2) and P1$b$($t$2), or the like of the first line segment L1($t$1) and the second line segment L1($t$2) of which a variation is equal to or greater than a variation threshold value, and separately extracts the first feature point P2($t$1) and the second feature point P2($t$2), or the like of the first line segment L2($t$1) and the second line segment L2($t$2) of which a variation is smaller than the variation threshold value. The object recognizer 24 then determines corresponding points in the second captured image F2 corresponding to the first feature points P1$a$($t$1) and P1$b$($t$1) of the first line segment L1($t$1) of which the variation is equal to or greater than the variation threshold value as the second feature points P1$a$($t$2) and P1$b$($t$2) of the second line segment L1($t$2) corresponding to the first line segment L1($t$1) of which the variation is smaller than the variation threshold value. By way of the above, the object recognizer is able to recognize an object (S5).

Figure 6A:
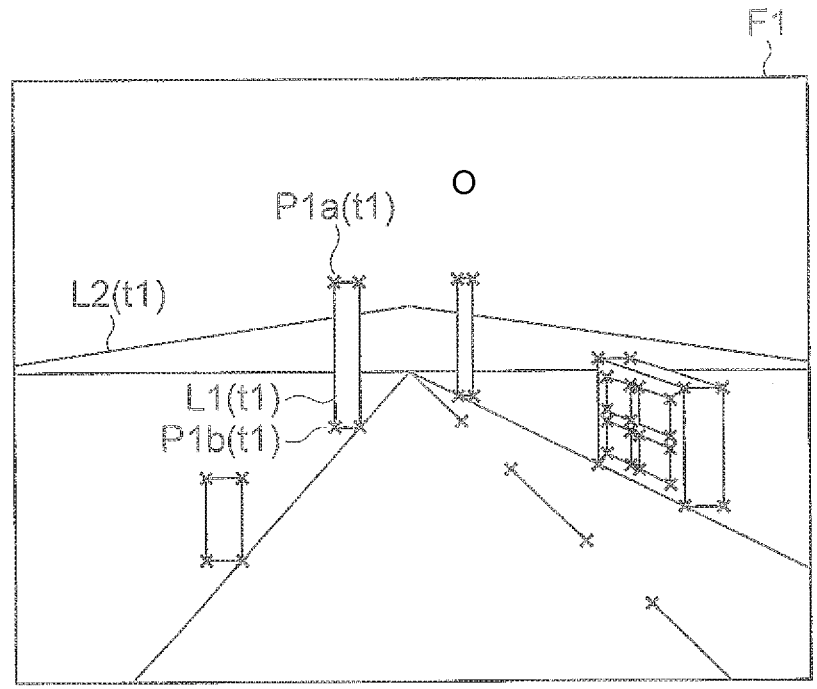
FIG. 6A is a diagram illustrating a state where a first feature point of a first line segment of which a variation is equal to or greater than a variation threshold value is extracted.
Figure 6B:
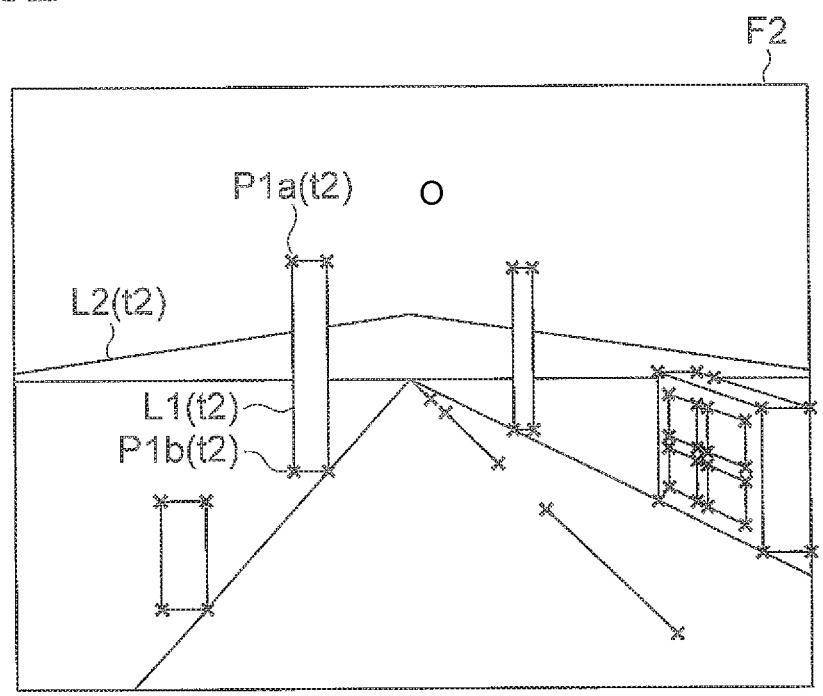
FIG. 6B is a diagram illustrating a state where a second feature point of a second line segment of which a variation is equal to or greater than a variation threshold value is extracted.

As shown in FIG. 6A, the first feature points P1$a$($t$1) and P1$b$($t$1), or the like of the first line segment L1($t$1) or the like of which the variation is equal to or greater than the variation threshold value are extracted as feature points of only a close object, for example a target object [O]. Similarly, as shown in FIG. 6B, the second feature points P1$a$($t$2) and P1$b$($t$2), or the like of the second line segment L1($t$2) or the like of which the variation is equal to or greater than the variation threshold value are extracted as feature points of only the close object. The object recognizer 24 associates the first feature point P1$a$($t$1) and the second feature point P1$a$($t$2) which are present at the same position on the object with each other, and associates the first feature point P1$b$($t$1) and the second feature point P1$b$($t$2) which are present at the same position on the object with each other. The object recognizer 24 may compare luminances of pixels of the first feature points P1$a$($t$1) and P1$b$($t$1) with luminances of pixels of the second feature points P1$a$($t$2) and P1$b$($t$2) to perform the association. The object recognizer 24 may perform the association by a KLT tracker technique, search along an epipolar line, or the like, for example.

Figure 7:
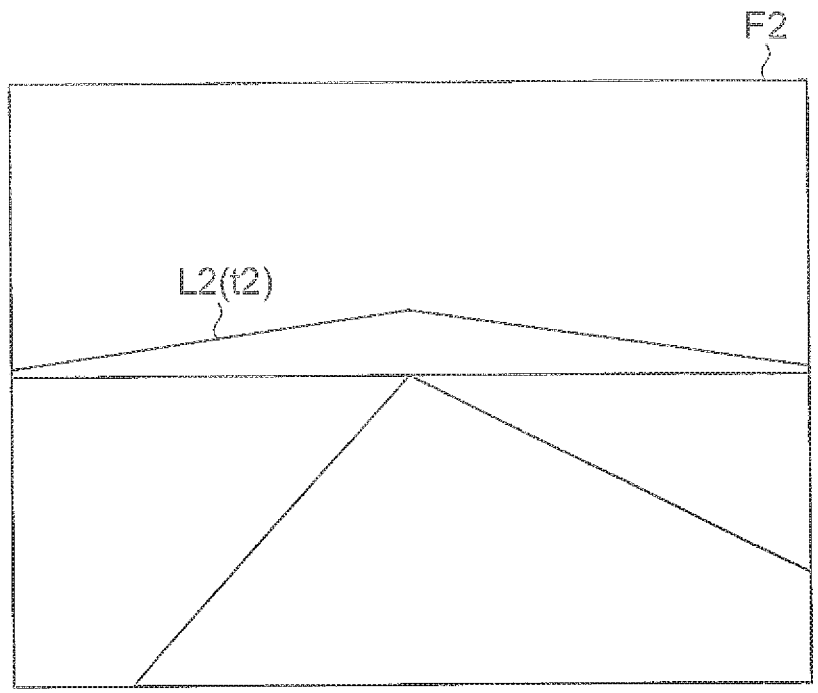
FIG. 7 is a diagram illustrating a state where a second line segment of which a variation is smaller than a variation threshold value in the second captured image is extracted.

As shown FIG. 7, the second line segment L2($t$2) or the like of which the variation is smaller than the variation threshold value is extracted as an outline of a mountain or the like in a distant view, that is, a distant scene. As shown in FIG. 7, the object recognizer 24 may interpolate a portion of the second line segment L2($t$2) of which the variation is smaller than the variation threshold value, which is considered to be cut off by the second line segment L1($t$2) of which the variation is equal to or greater than the variation threshold value, to thereby form a captured image indicating only a distant scene. The interpolation may be performed by comparing slopes, coordinates of end points, luminances of pixels thereof, and the like of the second line segment L2($t$2) and the like of which the variation is smaller than the variation threshold value in the second captured image F2.

Figure 8A:
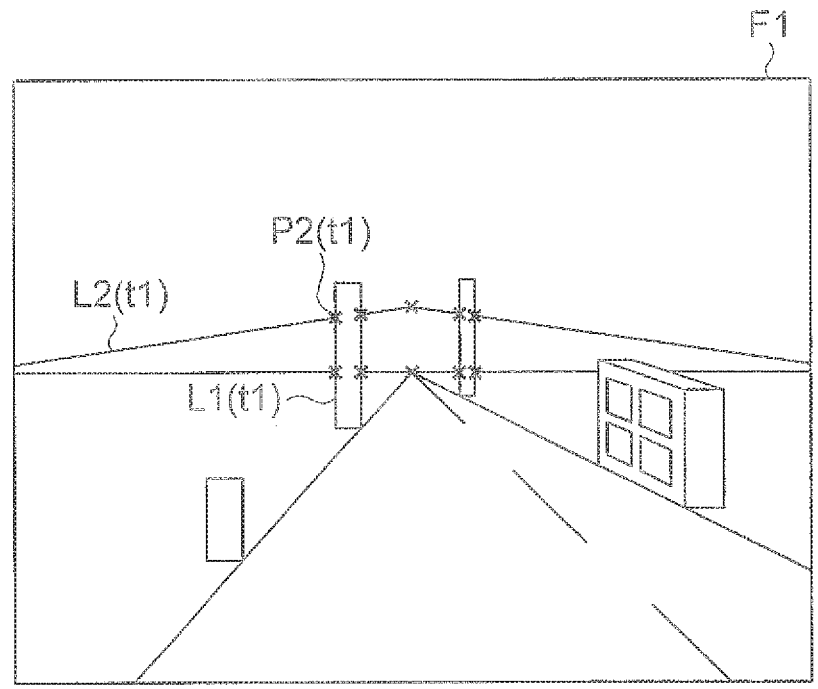
FIG. 8A is a diagram illustrating a state where a first feature point of a first line segment of which a variation is smaller than a variation threshold value is extracted.
Figure 8B:
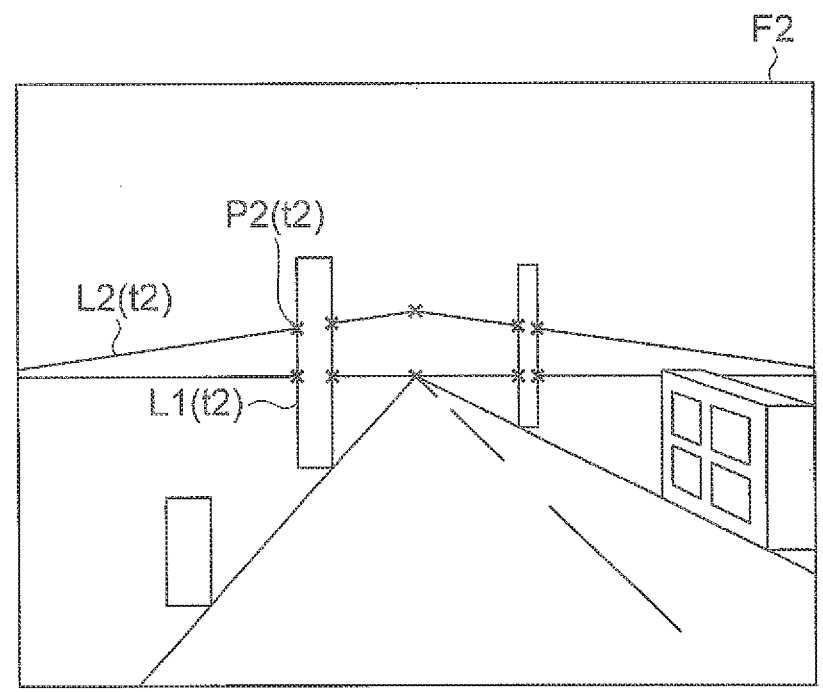
FIG. 8B is a diagram illustrating a state where a second feature point of a second line segment of which a variation is smaller than a variation threshold value is extracted.

As shown in FIG. 8A, the first feature point P2($t$1) or the like of the first line segment L2($t$1) or the like of which the variation is smaller than the variation threshold value is extracted as a feature point based on a distant scene. Similarly, as shown in FIG. 8B, the second feature point P2($t$2) or the like of the second line segment L2($t$2) or the like of which the variation is smaller than the variation threshold value is extracted as a feature point based on a distant scene.

Even when the first feature point P2($t$1) is registered in association with the first line segment L1($t$1) of which the variation is equal to or greater than the variation threshold value, if the first feature point P2($t$1) is also registered in association with the first line segment L2($t$1) of which the variation is smaller than the variation threshold value in a duplicated manner, the first feature point P2($t$1) is treated as a feature point of the first line segment L2($t$1) of which the variation is smaller than the variation threshold value. Similarly, even when the second feature point P2($t$2) is registered in association with the second line segment L1($t$2) of which the variation is equal to or greater than the variation threshold value, if the second feature point P2($t$2) is also registered in association with the second line segment L2($t$2) of which the variation is smaller than the variation threshold value in a duplicated manner, the second feature point P2($t$2) is treated as a feature point of the second line segment L2($t$2) of which the variation is smaller than the variation threshold value.

However, for a first feature point registered in association with both the first line segment of which the variation is equal to or greater than the variation threshold value and the first line segment of which the variation is smaller than the variation threshold value in a duplicated manner, when this first feature point is a lower end point of the first line segment of which the variation is equal to or greater than the variation threshold value, which corresponds to a line segment obtained by extending, in a vertical direction, the first line segment of which the variation is equal to or greater than the variation threshold value, there is a high probability that the first feature point is a contact point with respect to a road surface, and thus, the feature point moves on an outline of an object. Thus, this feature point may be exceptionally treated as a feature point of the first line segment of which the variation is equal to or greater than the variation threshold value. This is similarly applied to a second feature point registered in association with the second line segment of which the variation is equal to or greater than the variation threshold value and the second line segment of which the variation is smaller than the variation threshold value in a duplicated manner.

Figure 9A:
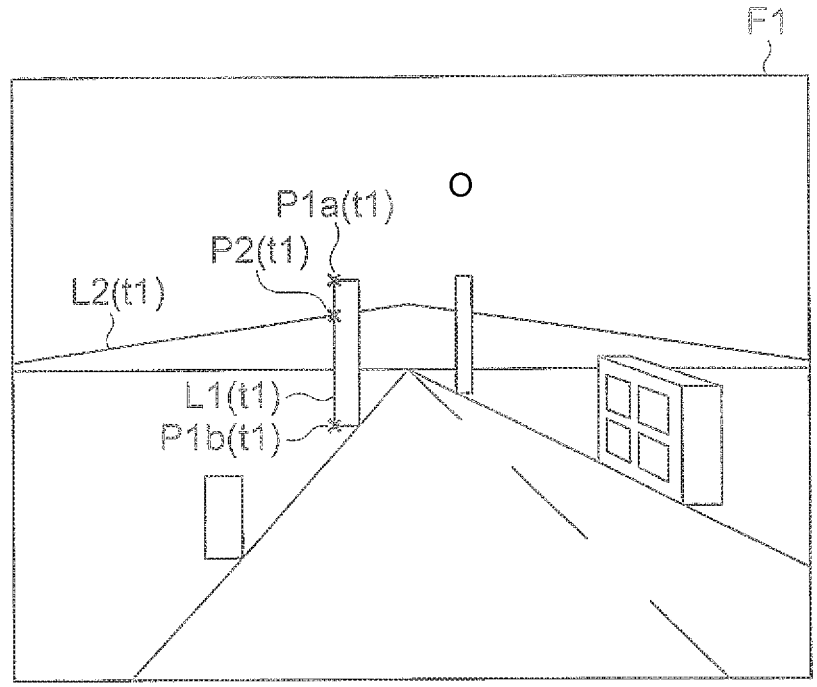
FIG. 9A is a diagram illustrating a state where a positional relationship of a first feature point of which a variation is smaller than a variation threshold value with respect to a first feature point of which a variation is equal to or greater than the variation threshold value, in the first line segments, is calculated.

In an embodiment, as shown in FIG. 9A, the object recognizer 24 extracts the first feature point P2($t$1) which is an intersection point between an end point of the first line segment L2($t$1) of which the variation is smaller than the variation threshold value and the first line segment L1($t$1) of which the variation is equal to or greater than the variation threshold value. Further, as shown in FIG. 9B, the object recognizer 24 extracts the second feature point P2($t$2) which is an intersection point between an end point of the second line segment L2($t$2) of which the variation is smaller than the variation threshold value and the second line segment L1($t$2) of which the variation is equal to or greater than the variation threshold value.

As shown in FIG. 9A, the object recognizer 24 calculates a positional relationship in the first captured image F1 between the first feature point P2($t$1) which is the intersection point between the end point of the first line segment L2($t$1) of which the variation is smaller than the variation threshold value and the first line segment L1($t$1) of which the variation is equal to or greater than the variation threshold value, and the first feature points P1a(t1) and P1b(t1) of the first line segment L1(t1) of which the variation is equal to or greater than the variation threshold value. Specifically, for example, the object recognizer 24 calculates a ratio of a distance between the first feature point P2(t1) and the first feature point P1a(t1) to a distance between the first feature point P1b(t1) and the first feature point P2(t1), with respect to the first feature points P1a(t1), P1b(t1), and P2(t1) on the same first line segment L1(t1).

Figure 9B:
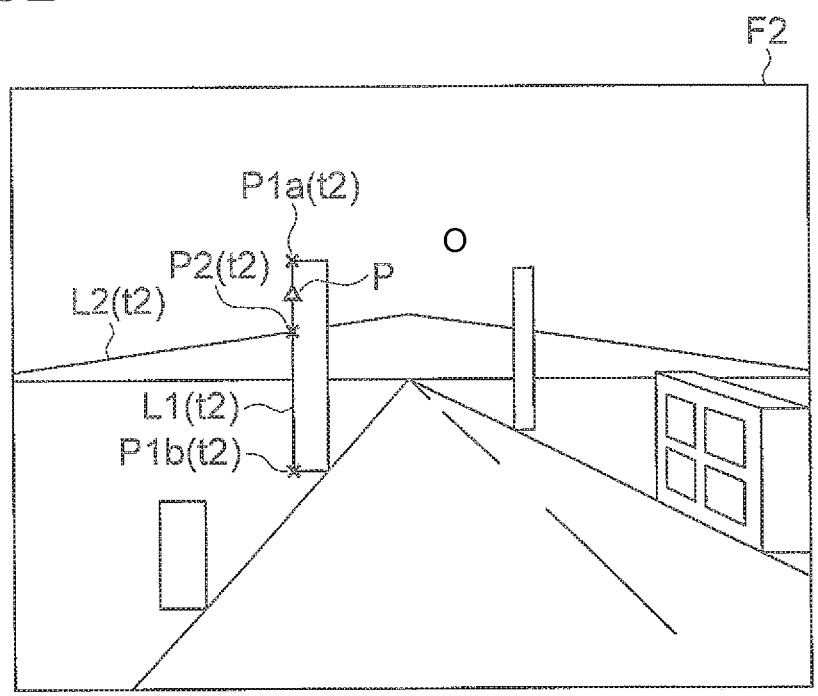
FIG. 9B is a diagram illustrating a state where a position corresponding to a first feature point of which a variation is smaller than a variation threshold value in the second captured image is calculated based on the positional relationship in FIG. 9A.

As shown in FIG. 9B, the object recognizer 24 determines a corresponding point P which is a point at a position in the second captured image F2 corresponding to the first feature point P2(t1) which is the intersection point between the end point of the first line segment L2(t1) of which the variation is smaller than the variation threshold value and the first line segment L1(t1) of which the variation is equal to or greater than the variation threshold value based on the positional relationship between the first feature points P1a(t1), P1b(t1), and P2(t1). Specifically, for example, the object recognizer 24 determines the corresponding point P so that the ratio of the distance between the first feature point P2(t1) and the first feature point P1a(t1) to the distance between the first feature point P1b(t1) and the first feature point P2(t1) is the same as a ratio of a distance between the corresponding point P and the second feature point P1a(t2) to a distance between the second feature point P1b(t2) and the corresponding point P, on the same second line segment L1(t2). The object recognizer 24 associates the corresponding point P instead of the second feature point P2(t2) as the second feature point corresponding to the first feature point P2(t1).

The object recognizer 24 recognizes an object based on the first feature points P1a(t1) and P1b(t1) and the second feature points P1a(t2) and P1b(t2), and the first feature point P2(t1) and the corresponding point P associated with each other as described above.

As shown in FIG. 2, as a host vehicle motion estimation process, the vehicle controller 25 estimates a motion condition such as a speed, acceleration or direction of a vehicle based on information relating to the first feature points P1a(t1), P1b(t1), and P2(t1), the second feature points P1a(t2) and P1b(t2), and the corresponding point P based on only the object recognized by the object recognizer 24, and a vehicle speed detected by the vehicle speed sensor 12 (S6). The estimation of the motion condition of the vehicle may be performed by a method of estimating an F matrix using an eight-point algorithm based on the information relating to the first feature point P1a(t1) and the like, calculating rotational and translational components using singular value decomposition, and matching sizes using the vehicle speed detected by the vehicle speed sensor 12, for example. Thus, even when detecting a motion condition of a vehicle based on only a detection result of the vehicle speed sensor 12 or the gyro sensor 13, it is possible to estimate the motion condition of the vehicle with high accuracy.

As a three-dimensional position estimation process, the object recognizer 24 calculates the position of an object in a three-dimensional space using a triangulation principle or the like, for example, based on the recognition result in the object recognition process and the motion condition of the vehicle in the host vehicle motion estimation process (S7). The vehicle controller 25 of the ECU 20 performs necessary control by the display 31, the speaker 32, or the actuator 33 according to the position of the object in the three-dimensional space.

According to an embodiment, the object recognizer 24 of the image processing apparatus 1 separately extracts the first feature points P1a(t1) and P1b(t1) and the second feature points P1a(t2) and P1b(t2) of the first line segment L1(t1) and the second line segment L1(t2) of which the variation is equal to or greater than the variation threshold value, and the first feature point P2(t1) and the second feature point P2(t2) of the first line segment L2(t1) and the second line segment L2(t2) of which the variation is smaller than the variation threshold value, and determines the corresponding points in the second captured image F2 corresponding to the first feature points P1a(t1) and P1b(t1) of the first line segment L1(t1) of which the variation is equal to or greater than the variation threshold value as the second feature points P1a(t2) and P1b(t2) of the second line segment L1(t2) corresponding to the first line segment L1(t1) of which the variation is equal to or greater than the variation threshold value to recognize an object. Thus, the first feature points P1a(t1) and P1b(t1) and the second feature points P1a(t2) and P1b(t2) based on only an object which is a recognition target, and the first feature point P2(t1) and the second feature point P2(t2) based on a distant scene which is not a recognition target are distinguished from each other, and the first feature points P1a(t1) and P1b(t1) and the second feature points P1a(t2) and P1b(t2) based on only the object which is the recognition target are associated with each other. Thus, it is possible to enhance recognition accuracy of an object.

Further, according to an embodiment, the object recognizer 24 extracts the first feature point P2(t1) which is an intersection point between an end point of the first line segment L2(t1) of which the variation is smaller than the variation threshold value and the first line segment L1(t1) of which the variation is equal to or greater than the variation threshold value as the first feature point P2(t1) of the first line segment L2(t1) of which the variation is smaller than the variation threshold value, to thereby recognize an object. Thus, the first feature points P1a(t1) and P1b(t1) based on only an object which is a recognition target, and an intersection point between an outline of the object which is the recognition target and an outline of an object which is not a recognition target are distinguished from each other. For example, feature points may be divided into distant scene feature points and target object feature points on the basis of the positional variation of associated line segments. Thus, it is possible to reduce erroneous recognition.

Further, according to an embodiment, the object recognizer 24 determines the corresponding point P in the second captured image F2 corresponding to the first feature point P2(t1) which is the intersection point between the end point of the first line segment L2(t1) of which the variation is smaller than the variation threshold value and the first line segment L1(t1) of which the variation is equal to or greater than the variation threshold value based on the positional relationship in the first captured image F1 between the first feature point P2(t1) which is the intersection point between the end point of the first line segment L2(t1) of which the variation is smaller than the variation threshold value and the first line segment L1(t1) of which the variation is equal to or greater than the variation threshold value, and the first feature points P1a(t1) and P1b(t1) of the first line segment L1(t1) of which the variation is equal to or greater than the variation threshold value. Thus, the corresponding point P in the second captured image F2 corresponding to an intersection point between an outline of an object which is a recognition target and an outline of a distant scene which is not a recognition target in the first captured image F1 is determined based on the first feature points P1a(t1) and P1b(t1) and the second feature points P1a(t2) and P1b(t2)

based on only the object which is the recognition target. Thus, it is possible to enhance recognition accuracy of an object.

That is, when feature points are simply associated with each other based on luminances of the feature points or the like, as shown in FIGS. 9A and 9B, there is a concern that the first feature point P2(*t*1) which is the intersection point between the end point of the first line segment L2(*t*1) of which the variation is smaller than the variation threshold value and the first line segment L1(*t*1) of which the variation is equal to or greater than the variation threshold value in the first captured image F1 and the second feature point P2(*t*2) which is the intersection point between the end point of the second line segment L2(*t*2) of which the variation is smaller than the variation threshold value and the second line segment L1(*t*2) of which the variation is equal to or greater than the variation threshold value in the second captured image F2 may be associated with each other.

In this case, since the first line segment L1(*t*1) and the second line segment L1(*t*2), which form outlines of an object, move between the first captured image F1 and the second captured image F2, while the first line segment L2(*t*1) and the second line segment L2(*t*2), which form outlines of a distant scene, do not move between the first captured image F1 and the second captured image F2, the first feature point P2(*t*1) and the second feature point P2(*t*2) appear to move on the outlines of the object. Thus, there is a concern that positions which are not actually the same positions on the object may be erroneously recognized as the same position, or the position or movement amount of the object may not be accurately recognized. On the other hand, according to an embodiment, since the corresponding point P which is a point at the same position on an actual object in the second captured image F2 is associated with the first feature point P2(*t*1) in the first captured image F1, it is possible to enhance recognition accuracy of an object.

The image processing apparatus and the image processing method according to the invention are not limited to the above-described exemplary embodiments, and various modifications may be performed in a range without departing from the spirit of the invention.

For example, the object recognizer 24 may extract, as a first feature point and a second feature point of a first line segment and a second line segment of which a variation is smaller than a variation threshold value, a first feature point which is an intersection point between first line segments of which a variation is smaller than a variation threshold value and a second feature point which is an intersection point between second line segments of which a variation is smaller than a variation threshold value, to thereby recognize an object. In this case, the object may be recognized by extracting a feature point based on a distant scene and removing the distant scene from the first captured image F1 and the second captured image F2.

Further, even when the object recognizer 24 extracts the first feature point P2(*t*1) which is the intersection point between the end point of the first line segment L2(*t*1) of which the variation is smaller than the variation threshold value and the first line segment L1(*t*1) of which the variation is equal to or greater than the variation threshold value to recognize an object, the object recognizer 24 may not calculate the corresponding point P of the first feature point P2(*t*1), but instead, may remove the first feature point P2(*t*1) and the second feature point P2(*t*2) from an association target to recognize an object, to thereby make it possible to reduce a calculation load as the first feature point P2(*t*1) of the first line segment L2(*t*1) of which the variation is smaller than the variation threshold value.

In addition, it is not essential that the image processing apparatus 1 of this embodiment is mounted in a vehicle. The image processing apparatus may be stationary, and may be applied to recognize a moving object.

What is claimed is:

1. An image processing apparatus that recognizes an object based on a captured image obtained by a camera, comprising:
   a line segment extractor configured to extract a plurality of first line segments with respect to a first captured image at a first time point and to extract a plurality of second line segments with respect to a second captured image at a second time point after the first time point;
   a feature point extractor configured to extract a first feature point of each of the first line segments and to extract a second feature point of each of the second line segments;
   a variation calculator configured to calculate a variation of a position of each of the second line segments corresponding to each of the first line segments in the second captured image with respect to a position of each of the first line segments in the first captured image; and
   an object recognizer configured to extract target object feature points of the first feature points and the second feature points of the first line segments and the second line segments of which the variation is equal to or greater than a variation threshold value, separately extract distant scene feature points of the first feature points and the second feature points of the first line segments and the second line segments of which the variation is smaller than the variation threshold value, and to determine a corresponding point in the second captured image corresponding to a first target object feature point of the target object feature points as a second target object feature point of the target object feature points to recognize the object.

2. The image processing apparatus according to claim 1, wherein the object recognizer is configured to extract a first distant scene feature point, which is an intersection point between an end point of a first distant scene line segment of the first line segments of which the variation is smaller than the variation threshold value and a first target object line segment of the first line segments of which the variation is equal to or greater than the variation threshold value, to recognize the object.

3. The image processing apparatus according to claim 2, wherein the object recognizer is configured to determine the corresponding point in the second captured image corresponding to the intersection point between the end point of the first distant scene line segment and the first target object line segment based on a positional relationship in the first captured image between the intersection point and the first target object feature point.

4. The image processing apparatus according to claim 3, wherein the object recognizer is configured to calculate a first ratio of a distance between the first target object feature point and the intersection point on the first target object line segment to a distance between the intersection point and an opposite end point of the first target object line segment.

5. The image processing apparatus according to claim 4, wherein the object recognizer is configured to create a point in the second captured image at a position such that a second ratio of a distance between a second target object feature point and the point on a second target object line segment to a distance between the point and an opposite end point of the second target object line segment is equal to the first ratio.

6. The image processing apparatus according to claim 1, wherein the object recognizer is configured to calculate a position of the recognized object in three-dimensional space.

7. The image processing apparatus according to claim 6, wherein the object recognizer is configured to calculate a distance from the recognized object based on the position of the recognized object in three-dimensional space.

8. The image processing apparatus according to claim 1, further comprising:
a vehicle controller configured to output a control signal to one of a display, a speaker, and an actuator when a distance from the recognized object is smaller than a predetermined threshold value.

9. A vehicle control system comprising the processing apparatus according to claim 1, the vehicle controller comprising:
a vehicle controller configured to output a control signal to one of a display, a speaker, and an actuator when a distance from the recognized object is smaller than a predetermined threshold value.

10. The vehicle control system of claim 9, wherein the vehicle controller is configured to perform control for controlling any one of acceleration, braking and steering of the vehicle by an actuator when the distance from the recognized object is smaller than the predetermined threshold value.

11. An image processing method using an image processing apparatus that recognizes an object based on a captured image obtained by a camera, the method comprising:
extracting a plurality of first line segments with respect to a first captured image at a first time point and extracting a plurality of second line segments with respect to a second captured image at a second time point after the first time point;
extracting a first feature point of each of the first line segments and extracting a second feature point of each of the second line segments;
calculating a variation of a position of each of the second line segments corresponding to each of the first line segments in the second captured image with respect to a position of each of the first line segments in the first captured image; and
extracting target object feature points of the first feature points and the second feature points of the first line segments and the second line segments of which the variation is equal to or greater than a variation threshold value, separately extracting distant scene feature points of the first feature points and the second feature points of the first line segments and the second line segments of which the variation is smaller than the variation threshold value, and determining a corresponding point in the second captured image corresponding to a first target object feature point of the target object feature points as a second target object feature point of the target object feature points to recognize the object.

12. The image processing method according to claim 11, wherein a first distant scene feature point, which is an intersection point between an end point of a first distant scene line segment of the first line segments of which the variation is smaller than the variation threshold value and a first target object line segment of which the variation is equal to or greater than the variation threshold value, is extracted to recognize the object.

13. The image processing method according to claim 12, wherein the corresponding point in the second captured image corresponding to the intersection point between the end point of the first distant scene line segment and the first target object line segment is determined based on a positional relationship in the first captured image between the intersection point and the first target object feature point.

14. The image processing method according to claim 13, further comprising:
calculating a first ratio of a distance between the first target object feature point and the intersection point on the first target object line segment to a distance between the intersection point and an opposite end point of the first target object line segment.

15. The image processing method according to claim 14, further comprising:
creating a point in the second captured image at a position such that a second ratio of a distance between a second target object feature point and the point on a second target object line segment to a distance between the point and an opposite end point of the second target object line segment is equal to the first ratio.

16. The image processing method according to claim 14, further comprising:
associating the point with the intersection point.

17. The image processing method according to claim 11, further comprising:
calculating a position of the recognized object in three-dimensional space.

18. The image processing method according to claim 17, further comprising:
calculating a distance from the recognized object based on the position of the recognized object in three-dimensional space.

19. The image processing method according to claim 11, further comprising:
outputting a control signal to one of a display, a speaker, and an actuator when a distance from the recognized object is smaller than a predetermined threshold value.

20. The image processing method according to claim 11, further comprising:
performing control for controlling any one of acceleration, braking and steering of the vehicle by an actuator when the distance from the recognized object is smaller than the predetermined threshold value.

* * * * *